US010603590B2

(12) United States Patent
Kataoka

(10) Patent No.: US 10,603,590 B2
(45) Date of Patent: *Mar. 31, 2020

(54) GAME PRESENTING SYSTEM

(71) Applicants: Sony Corporation, Tokyo (JP); Sony Interactive Entertainment Inc., Tokyo (JP)

(72) Inventor: Yumi Kataoka, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 128 days.

This patent is subject to a terminal disclaimer.

(21) Appl. No.: 15/155,261

(22) Filed: May 16, 2016

(65) Prior Publication Data

US 2016/0256776 A1 Sep. 8, 2016

Related U.S. Application Data

(63) Continuation of application No. 12/173,408, filed on Jul. 15, 2008, now Pat. No. 9,373,214.

(30) Foreign Application Priority Data

Jul. 17, 2007 (JP) .................................. 2007-185884

(51) Int. Cl.
*A63F 13/00* (2014.01)
*A63F 9/24* (2006.01)
(Continued)

(52) U.S. Cl.
CPC ...... *A63F 13/5252* (2014.09); *G07F 17/3211* (2013.01)

(58) Field of Classification Search
CPC .... A63F 9/24; A63F 13/12; A63F 2009/2457; A63F 2009/2448; G06F 17/00; G07F 17/3211

See application file for complete search history.

(56) References Cited

U.S. PATENT DOCUMENTS 4,856,787 A * 8/1989 Itkis .................. G07F 17/32
273/237
2004/0053690 A1 3/2004 Fogel et al.
(Continued)

FOREIGN PATENT DOCUMENTS

| JP | H09-326970 A | 12/1997 |
|---|---|---|
| JP | 10-225575 | 8/1998 |
| JP | 2002-166057 A | 6/2002 |
| JP | 2002-248273 | 9/2002 |

(Continued)

OTHER PUBLICATIONS

Office Action issued in the corresponding Japanese Application No. 2014-232981 dated Feb. 2, 2016 and its Partial English Translation.
(Continued)

*Primary Examiner* — Milap Shah

(74) *Attorney, Agent, or Firm* — Haug Partners LLP; William S. Frommer

(57) ABSTRACT

To provide a game presenting system having a plurality of game systems for each executing a process of a game in which a plurality of users participate, and a game presenting machine for presenting a situation of the game executed by the game system, wherein the game presenting machine obtains a motion image related to the game executed by each of the plurality of game systems, and produces a game presenting screen image showing, as a list, at least some of the plurality of motion images obtained.

4 Claims, 5 Drawing Sheets

(51) Int. Cl.
    *A63F 13/5252*    (2014.01)
    *G07F 17/32*    (2006.01)

(56) References Cited

U.S. PATENT DOCUMENTS

| | | |
|---|---|---|
| 2004/0158865 A1 | 8/2004 | Kubler et al. |
| 2005/0003883 A1* | 1/2005 | Muir ................ G07F 17/32 463/16 |
| 2005/0159212 A1* | 7/2005 | Romney ............ G06Q 50/34 463/25 |
| 2006/0111168 A1 | 5/2006 | Nguyen et al. |
| 2007/0063999 A1 | 3/2007 | Park |
| 2008/0102916 A1* | 5/2008 | Kovacs ............. G07F 17/3211 463/16 |
| 2009/0186700 A1* | 7/2009 | Konkle ............. A63F 13/87 463/42 |
| 2011/0263332 A1* | 10/2011 | Mizrachi ........... A63F 13/12 463/42 |

FOREIGN PATENT DOCUMENTS

| | | |
|---|---|---|
| JP | 2004-533287 | 11/2004 |
| JP | 2005-182116 A | 7/2005 |
| JP | 2006-136350 A | 6/2006 |
| JP | 2006-167176 | 6/2006 |
| JP | 2007 58692 | 3/2007 |
| JP | 2008-522715 | 7/2008 |
| JP | 2008-188051 A | 8/2008 |
| WO | WO 2005/073933 | 8/2005 |
| WO | WO 2006/65240 | 6/2006 |
| WO | WO 2007019636 | 2/2007 |

OTHER PUBLICATIONS

Office Action issued in corresponding Japanese Application No. 2013-025912 dated Aug. 19, 2014 and the Partial English Translation.

Office Action issued in corresponding Japanese Application No. 2013-025912 dated May 7, 2014 and the Partial English Translation.

\* cited by examiner

| GAME SPECIFYING INFORMATION (COMMODITY NUMBER) | CONNECTION DESTINATION INFORMATION (IP ADDRESS) |
|---|---|
| XXX-01234 | 11.11.11.11 |
| YYY-56789 | 22.22.22.22 |
| ZZZ-43210 | 33.33.33.33 |
| ⋮ | ⋮ |

GAME PRESENTING SYSTEM

This is a continuation of application Ser. No. 12/173,408, filed Jul. 15, 2008, which is entitled to the priority filing date of Japanese application(s) 2007-185884, filed Jul. 17, 2007, the entirety of which is incorporated herein by reference.

BACKGROUND OF THE INVENTION

Field of the Invention

The present invention relates to a game presenting system, a game presenting machine, a game server, a game presenting method, and an information storage medium for presenting a situation of a game participated in by a plurality of users.

Description of the Related Art

There is available a game system (a multiple user game system) for carrying out a process for a game in which a plurality of users participate. Such a game system comprises a plurality of game terminals connected thereto via a communication network, for example, so that the users of the respective game terminals can participate in the same game to compete or enjoy together even when located apart from one another.

There is a case in which two or more such game systems are available, each independently carrying out a game of a multiple user participation type. In such a case, a user wishing to participate in a game needs to select a game system to participate in from among the plurality of game systems in consideration of their taste. To help selection of such a game system, there is available a technique for showing, as a list, the kinds (game titles) of the games executed in the respective game systems and also the numbers of users currently participating in the games and so forth, to thereby present such information to the user. There is also available a technique for suggesting a service in accordance with the manner of use when a user selects various services (see Japanese Patent Laid-open Publication No. 2007-58692, for example).

According to the above-described techniques, however, the user wishing to participate in a game may not be able to readily select a game to participate in due to not being able to readily comprehend the situation of the game, such as how the users play games in the respective game systems and so forth.

The present invention has been conceived in view of the above, and one of the objects of the present invention is to provide a game presenting system, a game presenting machine, a game server, a game presenting method, and an information storage medium for presenting to a user in a readily understandable manner the situations of the games respectively executed in a plurality of game systems.

SUMMARY OF THE INVENTION

In order to achieve the above-described object, according to one aspect of the present invention, there is provided a game presenting system having a plurality of game systems for each executing a process of a game in which a plurality of users participate, and a game presenting machine for presenting a situation of the game executed by the game system, wherein the game presenting machine comprises motion image obtaining means for obtaining a motion image related to the game executed by each of the plurality of game systems, and game presenting screen image production means for producing a game presenting screen image showing, as a list, at least some of the plurality of motion images obtained by the motion image obtaining means.

In the above described game presenting system, each of the game systems may comprise a plurality of game terminals each being a game terminal for use by a user participating in the game executed by the game system and having means for producing the motion image, game terminal selecting means for selecting a game terminal for producing the motion image to be obtained by the motion image obtaining means, from among the plurality of game terminals, and distribution means for distributing the motion image produced by the game terminal selected to the game presenting machine.

Further, each of the game terminals may produce a motion image showing, as the motion image, a game screen image to be presented to the user using the game terminal.

Still further, each of the game systems may further comprise game process information obtaining means for obtaining game process information about a game process executed in each of the plurality of game terminals, and the game terminal selecting means may select a game terminal for producing the motion image, based on the game process information obtained by the game process information obtaining means.

Yet further, the game process information may be information about an input/output process for information with respect to a user when executing the game process.

Yet further, the game process information may be information about a game operation executed by the user. Also, the game process information may be information about a rendering process for the game screen image to be presented to the user.

According to another aspect of the present invention, there is provided a game presenting machine connected to a plurality of game systems for each executing a process of a game in which a plurality of users participate, comprising motion image obtaining means for obtaining a motion image related to the game executed by each of the plurality of game systems, and game presenting screen image production means for producing a game presenting screen image showing, as a list, at least some of the plurality of motion images obtained by the motion image obtaining means.

According to still another aspect of the present invention, there is provided a game server for executing a process of a game in which a plurality of users participate, connected to a plurality of game terminals each used by a user participating in the game and having means for producing a motion image related to the game, and also to a game presenting machine for presenting a situation of the game, the game server comprising game terminal selecting means for selecting a game terminal for producing the motion image to be distributed to the game presenting machine, from among the plurality of game terminals, and distribution means for distributing the motion image produced by the game terminal selected to the game presenting machine.

According to yet another aspect of the present invention, there is provided a game presenting method, comprising a motion image obtaining step of obtaining a motion image related to the game executed by each of a plurality of game systems for executing a process of a game in which a plurality of users participate, and a game presenting screen image production step of producing a game presenting screen image showing, as a list, at least some of the plurality of motion images obtained at the motion image obtaining step.

According to yet another aspect of the present invention, there is provided a computer readable information storage medium storing a program for causing a computer to function as motion image obtaining means for obtaining a motion image related to the game executed by each of a plurality of game systems for executing a process of a game in which a plurality of users participate and game presenting screen image production means for producing a game presenting screen image showing, as a list, at least some of the plurality of motion images obtained by the motion image obtaining means.

DESCRIPTION OF THE PREFERRED EMBODIMENTS

In the following, one embodiment of the present invention will be described with reference to the accompanying drawings.

Figure 1:
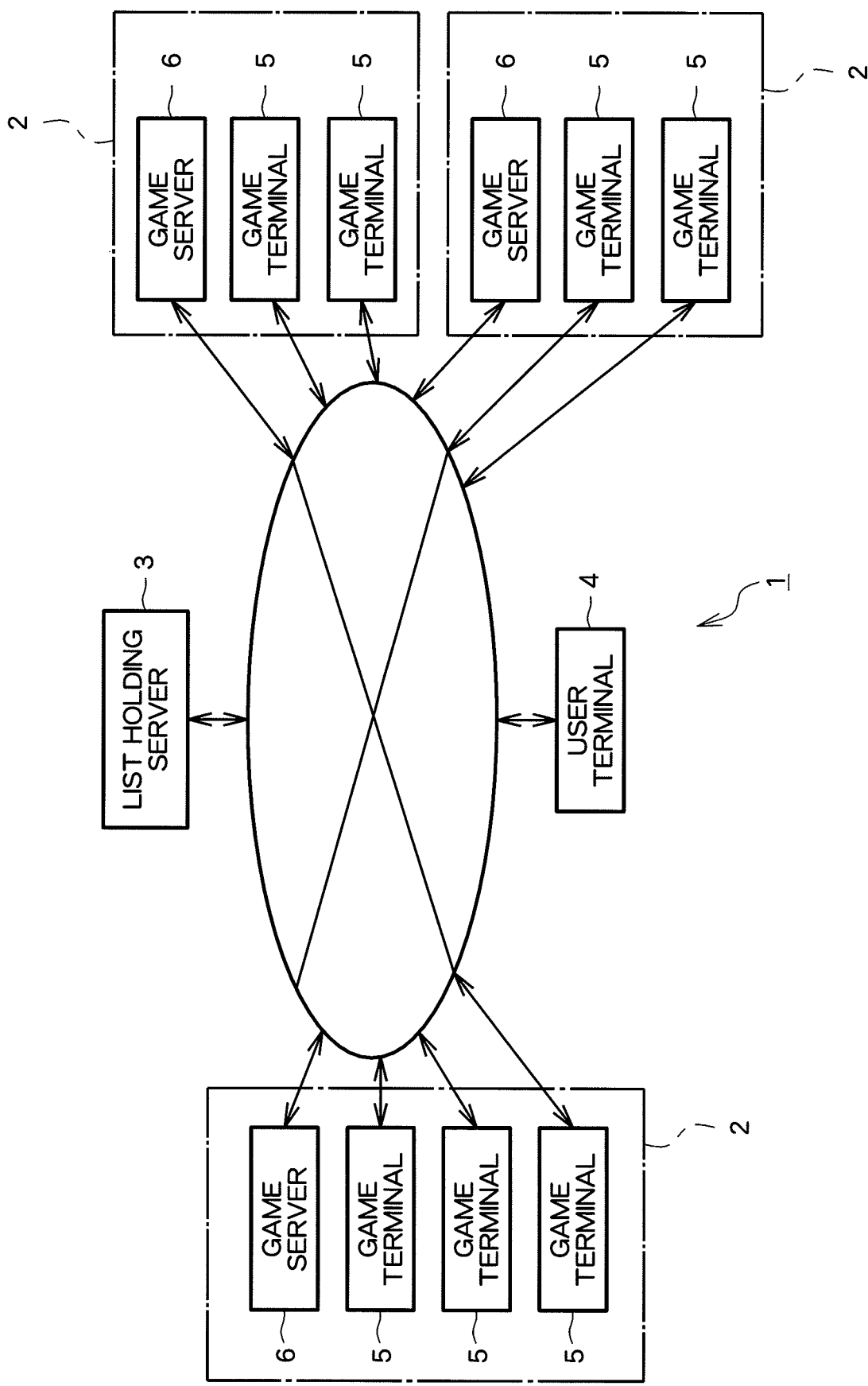
FIG. 1 is diagram outlining an example of an overall structure of a game presenting system according to an embodiment of the present invention.

As shown in FIG. 1, a game presenting system 1 according to one embodiment of the present invention comprises a plurality of game systems (multiple user game systems) 2, a list holding server 3, and a user terminal 4. The respective systems and the respective devices are mutually connected via a communication network such as the Internet, or the like.

Each of the game systems 2 carries out a process for a game in which a plurality of users participate (game of a multiple user participation type). Each game system 2 includes a plurality of game terminals 5 for use by the users participating in the game executed by the game system 2 and at least one game server 6 connected to the respective game terminals 5 via a communication network. The game executed in the game system 2 may be any game, such as a role playing game, a table game, a shooting game, and so forth, and either the same game or different games may be executed in the respective game systems 2.

The game terminal 5 may be a consumer game machine, a personal computer, and so forth, and functions as a client relative to the game server 6. In response to an instruction operation made by the user using the game terminal 5, each game terminal 5 sends information in accordance with the content of the operation to the game server 6, and displays a game screen image showing the situation of the game in accordance with the content of the user operation and/or information received from the game server 6.

Figure 2:
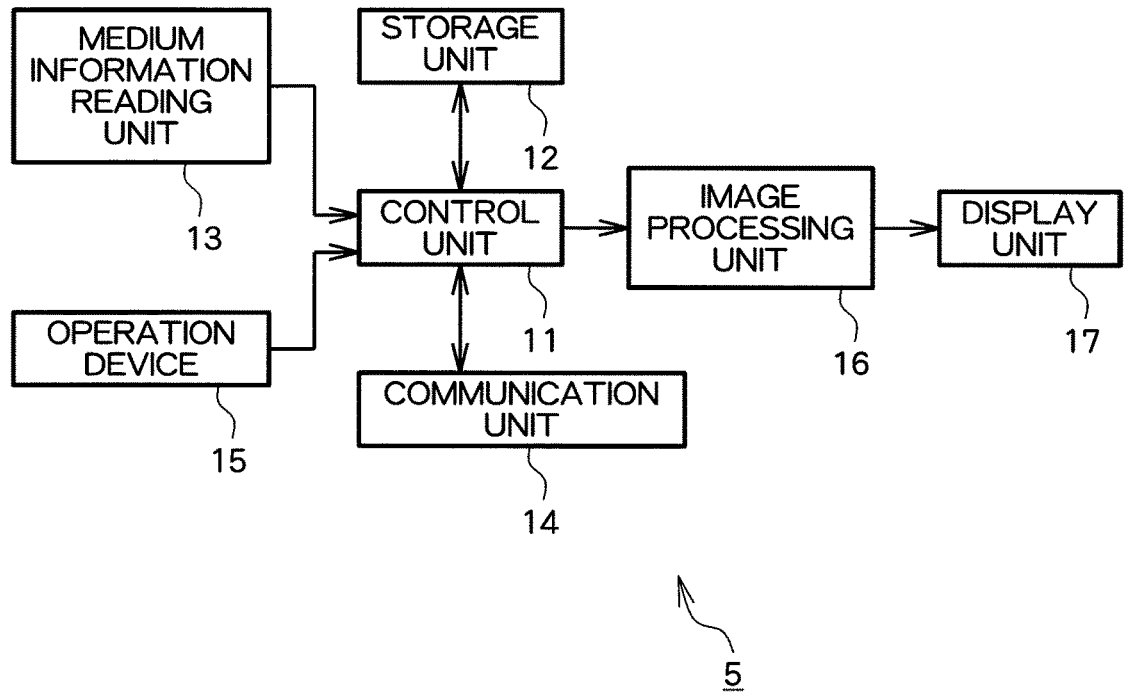
FIG. 2 is a block diagram showing an example of a structure of a game terminal according to the embodiment of the present invention.

As shown in FIG. 2, the game terminal 5 according to this embodiment comprises a control unit 11, a storage unit 12, a medium information reading unit 13, a communication unit 14, an operation device 15, an image processing unit 16, and a display unit 17.

The control unit 11, which may be a CPU or the like, for example, carries out various information processes according to a program stored in the storage unit 12. A specific example of a process to be executed by the control unit 11 according to this embodiment will be described later.

The storage unit 12 comprises a memory element, such as a RAM, a ROM, and so forth, and/or a hard disk and so forth, and stores a program to be executed by the control unit 11. This program may be provided as stored in various computer readable information storage media, such as an optical disc and so forth, or provided via a communication network, such as the Internet, or the like. The storage unit 12 functions also as a working memory of the control unit 11.

According to an instruction from the control unit 11, the medium information reading unit 13 reads a program and data stored in a computer readable information storage medium, such as an optical disc, a memory card, and so forth.

The communication unit 14 may be a communication interface, such as a LAN card or the like, for example, and sends information via a communication network in response to an instruction from the control unit 11. Further, the communication unit 14 receives information via the communication network and outputs to the control unit 11.

The operation device 15 may be a keyboard, a controller of a consumer game machine, or the like, for example, and receives a user's instruction operation and outputs operation data describing the content of the instruction to the control unit 11.

The image processing unit 16 comprises a GPU (Graphics Processing Unit) and a frame buffer, for example. The GPU renders various screen images into the frame buffer, based on the data supplied from the control unit 11. The screen image rendered into the frame buffer is converted into a video signal at a predetermined timing before being output to the display unit 17. The display unit 17 may be a home-use television set receiver, for example, and displays a screen image rendered into the frame buffer in the image processing unit 16.

The game server 6 carries out various game processes based on the information in accordance with the user operations sent from the respective game terminals 5, and sends the result of the execution to the respective game terminals 5. With the above, the users using the respective game terminals 5 can enjoy a game match or cooperate in playing a game even when the users are located apart from one another. The game server 6 may be either a dedicated server computer or any of the plurality of game terminals 5. That is, at least one of the game terminals 5 used by the users may additionally function as a game server 6.

The list holding server 3 may be a server computer, for example, connected to the plurality of game servers 6 via a communication network. The list holding server 3 produces list information about the game system 2 carrying out a process for a game in which a new user can participate, based on the information from the respective game servers 6, and holds the produced list information. In addition, the list holding server 3, responsive to a request from the user terminal 4, sends at least some of the list information to the user terminal 4.

The user terminal 4 is an information processing device used by a user (hereinafter referred to as a new user U1) wishing to participate in a game executed by any of the plurality of game systems 2. In the above, the user terminal 4 functions as a game presenting machine according to this embodiment, presenting to the new user U1 the situations of the games executed by the respective game systems 2.

Figure 3:
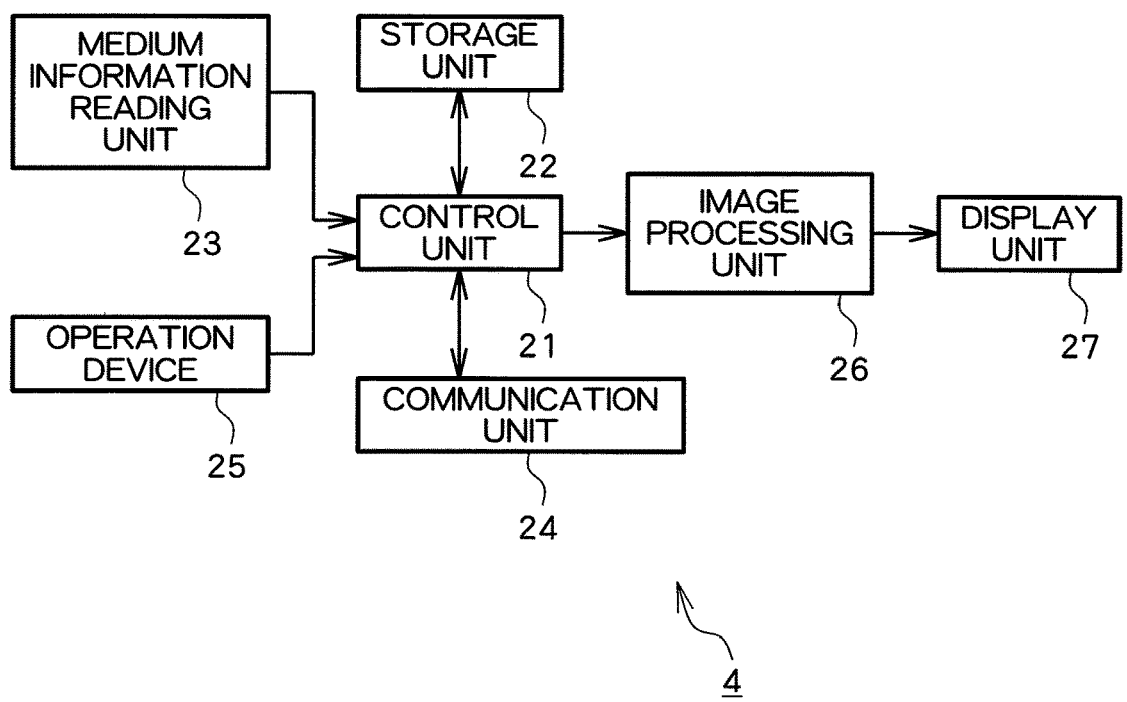
FIG. 3 is a block diagram showing an example of a structure of a user terminal according to the embodiment of the present invention.

The user terminal 4 may be a device, such as a consumer game machine, a personal computer, and so forth, which has a structure similar to that of the game terminal 5. Specifically, as shown in FIG. 3, the user terminal 4 comprises a control unit 21, a storage unit 22, a medium information reading unit 23, a communication unit 24, an operation device 25, an image processing unit 26, and a display unit 27.

In the following, a specific example of a function realized by the game presenting system 1 structured as described above will be described.

Initially, the game server 6 in each game system 2 sends game specifying information specifying a game executed by the game system 2 and connection destination information indicating the position in which the game server 6 is connected, to the list holding server 3. The game specifying information may be a commodity number, an identification symbol, and/or a title name of a game, and so forth, and may include version information and so forth of a game to be executed. The connection destination information specifies the position in which the game server 6 is connected in the network, and may include an IP address, a service port number, a domain name, and so forth. The respective game servers 6 send the game specifying information and the connection destination information to the list holding server 3, for example, when beginning a multiple user participation game.

The list holding server 3, having received the game specifying information and the connection destination information from the respective game servers 6, produces and holds list information about the game system 2 carrying out a game in which a new user can participate, based on the information received. The produced list information comprises data having the content such as is shown in FIG. 4, for example.

Figures 4, 5:
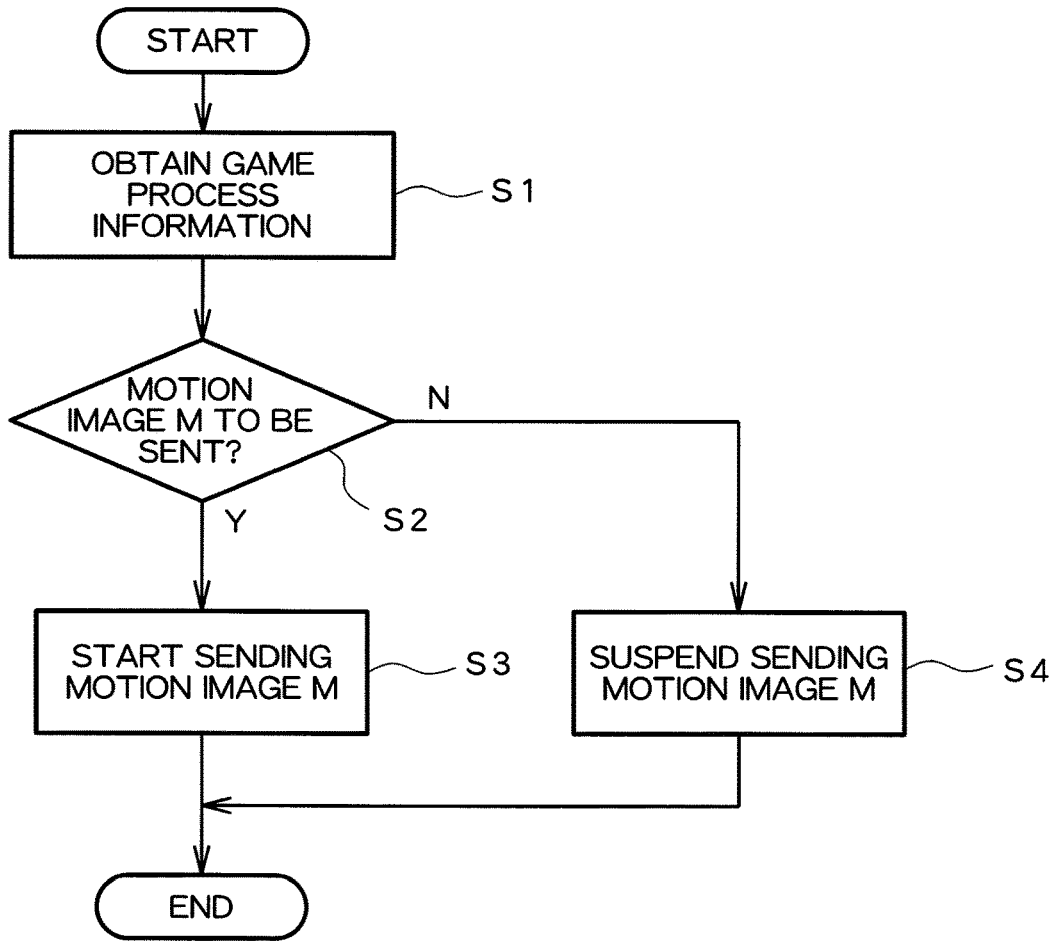
FIG. 4 is a diagram showing one example of list information held by a list holding server according to the embodiment of the present invention.
FIG. 5 is a flowchart of one example of a process to be executed by the game terminal in the embodiment of the present invention.

The control unit 11 of each game terminal 5 keeps carrying out a process such as is shown in the flowchart of FIG. 5 for every predetermined period of time, for example, while the game terminal 5 participates in the game system 2.

That is, initially, the game terminal 5 obtains information (hereinafter referred to as game process information) about a game process executed in the game terminal 5 (S1), and then determines, based on the obtained game process information, whether or not to send a motion image M related to the game process executed by itself to a game server 6 belonging to the same game system 2 (S2). For determination to send the motion image M, the game terminal 5 produces a motion image M and sends to the game server 6 (S3). For determination not to send the motion image M, on the other hand, the game terminal 5 suspends transmission of a motion image M to the game server 6 (S4). With the above, the game terminal 5 can send a motion image M to the game server 6, depending on the ongoing game situation, such, as when the game is building up.

Here, game process information will be specifically described. Game process information may concern a game operation executed by the user using the game terminal 5 relative to the operation device 15, for example. Specifically, the frequency with which the user operated the operation device 15 in an immediately prior predetermined period (that is, the number of times the user pressed a button within a predetermined period of time and so forth) may be included. In this case, the game terminal 5 determines to send a motion image M in response to the operation frequency in excess of a predetermined threshold. That is, the game terminal 5 keeps sending a motion image M to the game server 6 while the user frequently operates the game by successively pressing a button and so forth.

The game process information may concern a process to render a game screen image to be displayed on the display unit 17 of the game terminal 5 to thereby present the game screen image to the user of the game terminal 5. Specifically, the game terminal 5 may determine to send a motion image M when the frequency (a frame rate) with which an image is rendered into a frame buffer drops below a predetermined value, for example. The frame rate drops when the rendering process takes time. That is, with such a situation happening, it can be assumed that many characters appear on the game screen image, and that the game is crowded. That is, utilizing such information as game process information, the game terminal 5 can send a motion image M to the game server 6 when the game is crowded and so forth.

Also, game process information such as is described below may be utilized when the control unit 11 and the image processing unit 16 of the game terminal 5 place polygons representing various objects, such as a character, an obstacle, and so forth, in the virtual space and render an image showing the situation in the virtual space into the frame buffer. That is, the game terminal 5 obtains the number of vertexes of the polygon placed in the virtual space as game process information, and determines to send the motion image M when the number is equal to or larger than a predetermined number. In the above, the number of vertexes of a polygon which satisfies a predetermined condition may be exempted from those for use in the determination, such as those of a stationary polygon, a polygon having a predetermined attribute value, and so forth, so that the polygon for the background, for example, can be exempted from those for use in the determination. According to the above, transmission of the motion image M by the game terminal 5 to the game server 6 is executed when many characters are placed in the virtual space, such as when the game is crowded, similar to the above-described example with the frame rate.

The above described game process information concerns an information input/output process with respect to a user when the game terminal 5 carries out a game process. Use of the information makes it possible for the game terminal 5 to make determination such as is described above by executing a program contained in a system library and so forth, even though the game application program executed by the game terminal 5 does not have a game process information output function. It should be noted that the game terminal 5 may carry out the determination process at S2 based on parameter information about various game situations which are output according to a game application program, rather than limiting to that described above. Moreover, the above described various information may be combined for the determination.

The motion image M to be sent by the game terminal 5 to the game server 6 at S3 may show, on a real time basis, the situation of the game executed by the game terminal 5, and is used in presenting the situation of the game executed by the game system 2 to a new user U1. For example, the game terminal 5 may produce, as a motion image M, a motion image which represents a game screen image to be presented to the user using the game terminal 5. That is, the game terminal 5 produces a motion image M based on the data about a game screen image rendered into the frame buffer and shown on the display unit 17. Specifically, the game terminal 5 encodes the screen image data rendered in the frame buffer into motion image data in a predetermined data format (MPEG format, for example) for every predetermined period of time, while showing the screen image data in the display unit 17 to present to the user, to thereby produce a motion image M. In the above, data on a sound to be reproduced via a speaker (not shown) may be contained, together with the image shown on the display unit 17, in the motion image M. As described above, production of the motion image M based on the data about an image to be shown on the display unit 17 makes it possible to also present a screen image identical to the game screen image viewed by the user playing the game while using the game terminal 5 to a new user U1.

Alternatively, the game terminal 5 may produce, as a motion image M for transmission, a motion image different from the image shown on the display unit 17. That is, while the image processing unit 16 renders an image showing the situation in the virtual space into the frame buffer, as described above, the game terminal 5 may render an image obtained by viewing the virtual space from a viewpoint different from the viewpoint related to the image rendered into the frame buffer, to thereby produce a motion image M. In the above, the viewpoint position used for production of the motion image M may be fixed or movable, and determined according to the viewpoint position used in rendering an image into the frame buffer. With the above, the game presenting system 1 can present an image showing the situation in the virtual space, obtained by viewing from a position which is different from the viewpoint related to the screen image viewed by the user playing the game, and enables an image for better recognition of the entire situation.

Through the above described process, the game terminal 5 continues to distribute a motion image M, representing the situation that has resulted from the game process executed by the game terminal 5, to the game server 6 while a predetermined condition is satisfied.

Figure 6:
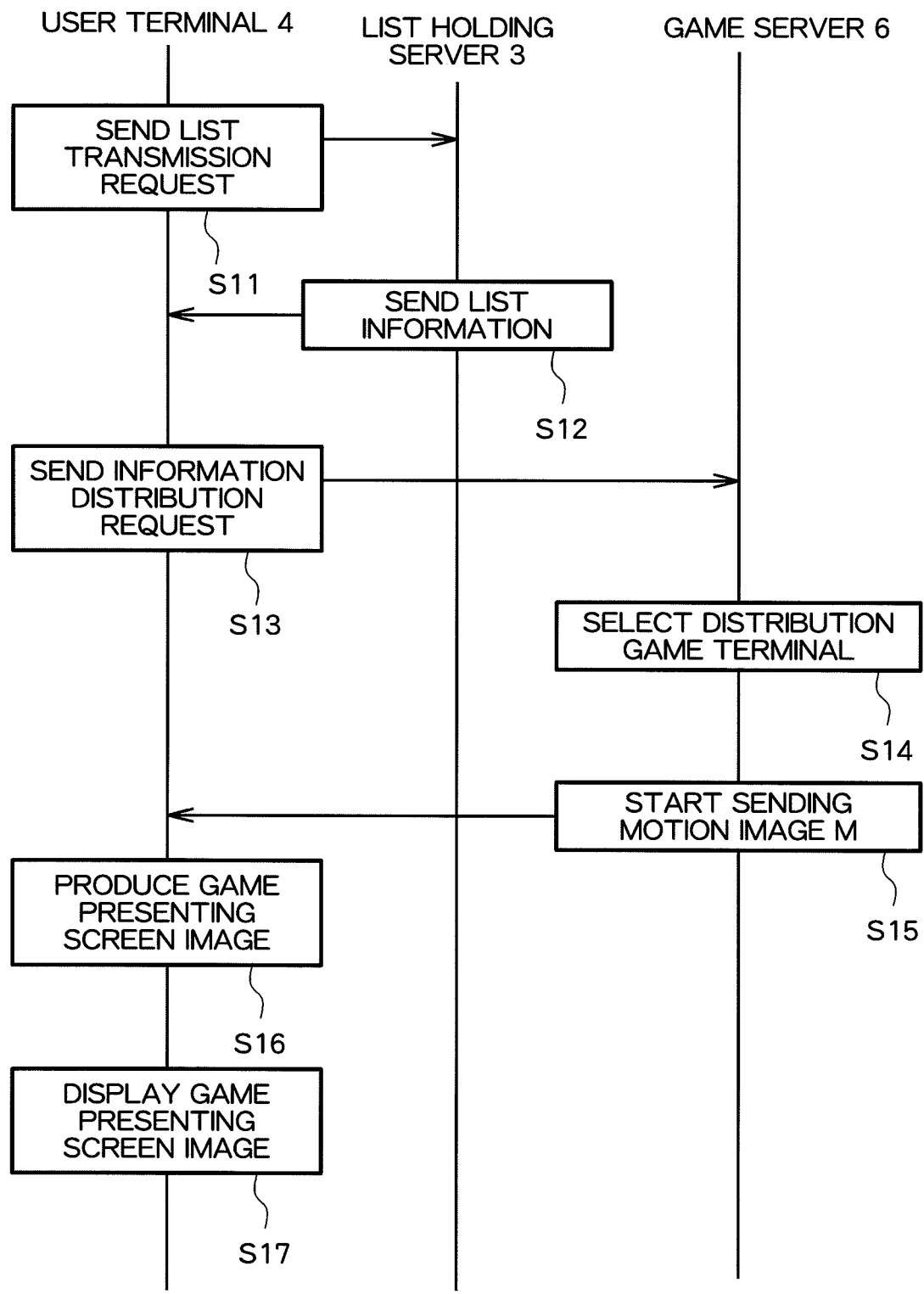
FIG. 6 is a flowchart of one example of a process to be executed by each of the devices according to the embodiment of the present invention.

In the following, example processes to be executed by the user terminal 4, the list holding server 3, and the game servers 6 in the respective game systems 2 when a new user U1 using the user terminal 4 wishes to participate in any game will be described based on the flowchart of FIG. 6.

That is, when there is a new user U1 wishing to participate in any game, the user terminal 4 initially sends a list transmission request to the list holding server 3 (S11). The list holding server 3, responsive to the request, sends at least some of its own list information (S12).

In the process at S11, the user terminal 4 sends information which specifies a game which the user terminal 4 can execute (executable game information), together with the list transmission request. That is, the user terminal 4 used by the user wishing to participate in a game executed in each game system 2 may need to carry out a client program corresponding to the game, and the new user U1 not in possession of a client program necessary in carrying out a game executed by the game system 2 cannot participate in the game. In view of the above, once information about a game which the user terminal 4 can carry out is sent to the list holding server 3, the list holding server 3 can exempt information about a game system carrying out a game in which the new user U1 cannot participate, from the information to be sent at S12.

Specifically, the user terminal 4 obtains game specifying information which specifies a game which the user terminal 4 can carry out, and sends to the list holding server 3 as executable game information to be described below. In the above, for example, the user terminal 4 may obtain game specifying information about a game program installed in a hard disk or the like stored in the storage unit 22 or stored in an optical disc or the like set to be read by the medium information reading unit 23. Alternatively, the user terminal 4, which has history information about any program ever executed by the user terminal 4 itself stored in the storage unit 22, may obtain executable game information based on the history information.

Still alternatively, the user terminal 4 may obtain executable game information based on saved data which is produced in past execution of a game by the new user U1. The saved data contains information unique to each user in connection with a game, such as a situation when the user quits playing the game while the game is still going and so forth, and different saved data is stored for every game, each containing game specifying information which specifies a corresponding game. The saved data is stored in an information storage medium, such as a memory card and so forth. The user terminal 4 obtains, as executable game information, the game specifying information contained in the saved data read from a memory card or the like by the medium information reading unit 23, for example, when carrying out the process at S11.

The list holding server 3 having received the executable game information compares the game specifying information contained in the received executable game information with the game specifying information specifying the games executed by the game systems 2, contained in the list information, then carries out a filtering process to extract information about the game system 2 which carries out a game identical to the game related to the executable game information, from the list information, and sends the filtered list information to the user terminal 4 in the process at S12. With the above, the list holding server 3 can send to the user terminal 4 only information about the game system 2 carrying out a game which it is estimated can be executed by the user terminal 4.

The user terminal 4 having received the list information from the list holding server 3 in the process at S12 sends an information distribution request to the respective game servers 6, based on the connection destination information contained in the received list information (S13). In the above, specifically, the user terminal 4 may sequentially send an information distribution request to the connection destinations identified by the connection destination information contained in the received list information until connection to a predetermined number of game servers 6 is established, or send information distribution requests to all of the connection destinations identified by the connection destination information contained in the list information.

Each of the game servers 6 having received the information distribution requests from the user terminal 4 at S13 selects a game terminal 5 for producing a motion image M to be distributed to the user terminal 4 (hereinafter referred to as a distribution game terminal) from among the game terminals 5 belonging to the game system 2 to which the game server 6 belongs (S14). For example, the game server 6 selects, based on a predetermined condition, a distribution game terminal from among the game terminals 5 sending a motion image M to the game server 6, following the process shown in the flowchart of FIG. 4 described above. A specific example of the selection process will be described later.

Then, the game server 6 begins distribution to the user terminal 4, of the motion image M sent from the distribution game terminal selected at S14 to the game server 6 (S15). In distribution of the motion image M, the game server 6 additionally sends, to the user terminal 4, various information about the game executed by the game system 2 to which the game server 6 belongs. The information sent by the game server 6 may include information indicating a country and a region where the game server 6 is installed, the server name (or a system name), the number of users participating in the ongoing game in the game server 6, the maximum number of users who can participate in the game, information about the user participating in the game (the user name, information about the country to which the user belongs, profile information, and so forth), various messages, and so forth.

In the process at S15, the user terminal 4 obtains a motion image M related to the game executed in each of the game systems 2 included in the list information obtained at S12. The user terminal 4 having obtained the motion images M from the respective game servers 6 produces a game presenting screen which shows, as a list, at least some of the obtained motion images M (S16), and shows the produced game presenting screen image on the display unit 27 (S17).

Figure 7:
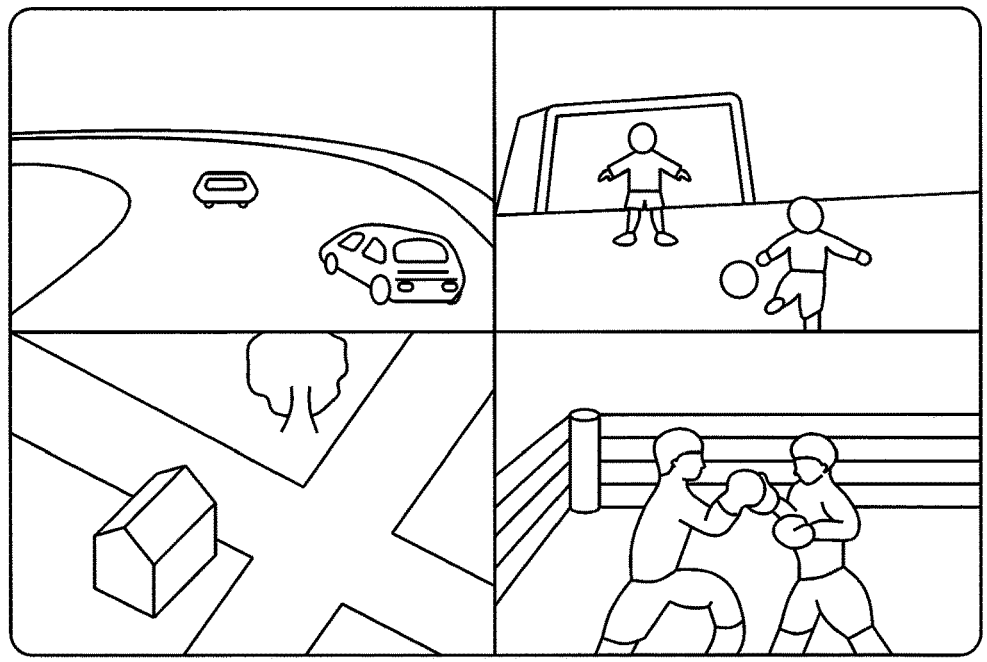
FIG. 7 is a diagram showing one example of a game presenting screen image.

FIG. 7 is a diagram showing one example of the game presenting screen image produced by the user terminal 4 in the process at S16. For example, the game presenting screen is a screen image having a plurality of display areas defined therein, each showing one motion image M received from the game server 6. In the example shown in FIG. 7, four motion images M showing the situations of the games respectively executed in four game systems 2 are shown in the form of a list on the game presenting screen. With the above, the new user U1 can know on a real time basis the situations of the games played by the users participating in the respective games by viewing the simultaneously shown respective motion images M, and select the game system 2 in which the user wishes to participate.

With the game presenting screen such as is shown in FIG. 7, displayed, the new user U1 instructs the operation device 25 to select one motion image M. The user terminal 4, in response to the instruction operation, sends a game participation request to the game server 6 which distributes the selected motion image M. In response to the game participation request from the user terminal 4, the game server 6 determines according to a predetermined condition whether or not to permit participation of the user in the game, and returns the result of determination to the user terminal 4. The user terminal 4, when permitted by the game server 6 to participate in the game, begins the game process as one of the game terminals 5 belonging to the game system 2 to which the game server 6 belongs so that the new user U1 can participate in the game executed by the game system 2.

Figure 8:
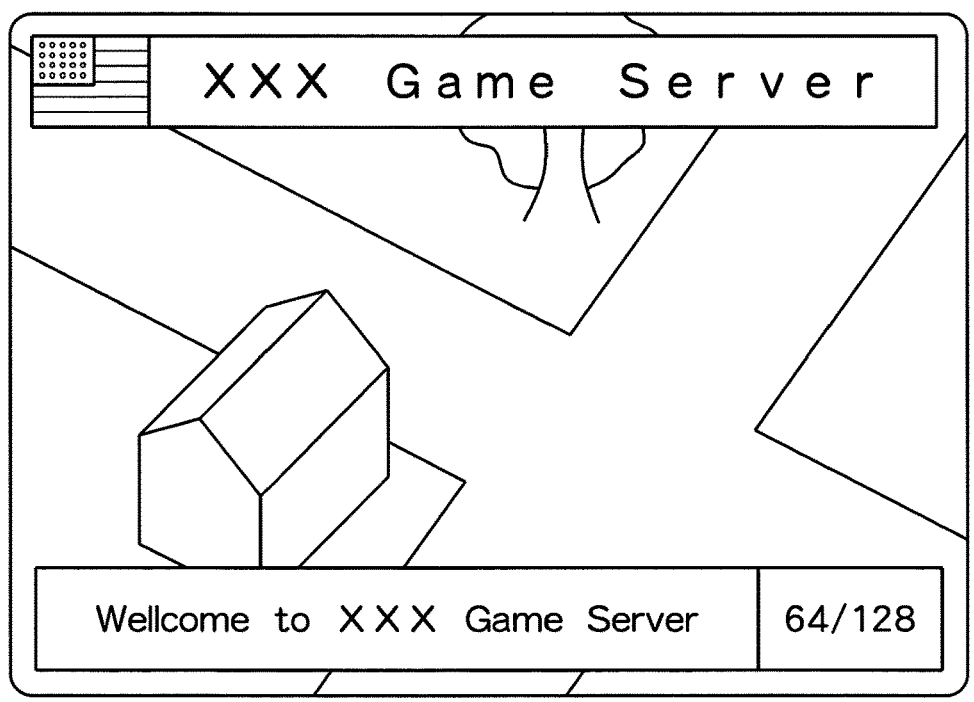
FIG. 8 is a diagram showing one example of a detail information presenting screen image.

In the above, while the game presenting screen image is displayed, the user terminal 4 may produce and display a detail information presenting screen image which shows detail information of the game related to one of the plurality of motion images M, designated by the user, in response to the user's instruction operation. FIG. 8 is a diagram showing one example of such a detail information presenting screen image. In the example shown in FIG. 8, various information items sent at S15 by the game server 6 which distributes the motion image M are shown with the motion image M as background. Specifically, a national flag of the country where the game server 6 is installed is shown upper left in the screen image, accompanied by the server name shown on the right side thereof; a message is shown lower in the screen image; and the maximum number of users who can participate in the game and that of the users currently participating in the game are shown to the right of the message.

While the detail information presenting screen is displayed or the like, the user terminal 4 may send to the game server 6 in response to the user's instruction operation a request for switching from the currently displayed motion image M to a motion image M produced by other game terminal 5. That is, the game server 6, having received motion images M from a plurality of game terminals 5 and distributed one of the motion images M, selected at the step S14, to the user terminal 4, as described above, begins distribution of a motion image selected from among those received from the game terminal 5, but different from the motion image M having been distributed thus far, in response to the switching request from the user terminal 4. In the above, the motion image M to be newly distributed may be the one designated by the new user U1, for example. This arrangement makes it possible for the new user U1 to select the user whom the new user U is interested in from among those participating in a certain game system 2, for example, to review the play screen image viewed by the selected user.

Here, a specific example of the above-described selection process executed by the game server 6 at S14 will be described.

When motion images M to be distributed to the user terminals 4 can be switched according to a designation from the new user U1, as described above, and the game server 6 distributes a motion image M to other user terminal 4, the game server 6 selects a motion image M to be distributed to the new user terminal 4 as described below, for example. That is, upon receipt of an information distribution request at S13 from the new user terminal 4, the game server 6 selects, the motion image M currently distributed to more terminals 4 from among other user terminals 4 as a motion image M to be distributed to the new user terminal 4. This arrangement makes it possible to distribute the motion image M viewed by more users and thus attracts more attention to the new user terminal 4.

The game server 6 may hold information about a user who has ever in the past participated in the game which is executed by the game server 6, and select a distribution game terminal based on the information. Specifically, the game server 6 may hold match performance, ranking information, and so forth of a user who has ever in the past participated in the game, which is executed by the game server 6, and selects, as a distribution game terminal, the game terminal 5 used by the most highly ranked user, for example, among those participating in the game at the time of receipt of an information distribution request from the user terminal 4. This arrangement makes it possible to present the play screen image viewed by the highly ranked user to the new user U1.

Alternatively, the game server 6 may obtain the above described game process information from the respective game terminals 5 and select a distribution game terminal based on the obtained game process information. Specifically, the game terminals 5 send game process information, such as a frequency with which the user operates the operation device 15 and so forth, to the game server 6 every predetermined period of time, and the game server 6 compares the game process information received from the respective game terminals 5 with one another and selects the game terminal 5 having the highest frequency, for example, as a distribution game terminal.

It should be noted that, whereas it is described in the above that the game terminals 5 send motion images M to the game server 6 only while a predetermined condition is satisfied, as shown in the flowchart of FIG. 5, and the game server 6 selects a distribution game terminal from among the game terminals 5 sending the motion images M to the game server 6 in the process at S14, an embodiment of the present invention is not limited to the described above. For example, the game terminals 5 may continue transmission of motion images M to the game server 6 while participating in the game system 2. In this case, the game server 6 can select a distribution game terminal from among all game terminals 5 belonging to the same game system 2.

Alternatively, the game terminals 5 may refrain from transmitting a motion image M until receipt of an explicit request from the game server 6. In this case, the game server 6 selects a distribution game terminal, based on the game process information and so forth obtained from the respective game terminals 5 when receiving an information distribution request from the user terminal 4 at S13, for example. The game server 5 sends a motion image M distribution request to the selected distribution game terminal. In response to the request, the distribution game terminal begins production of a motion image M and transmission of the same to the game server 6, which in turn distributes the motion image M received from the distribution game terminal to the user terminal 4.

In the above, instead of receiving the motion image M from the distribution game terminal and relaying to the user terminal 4, the game server 6 may instruct the selected distribution game terminal to distribute a motion image M directly to the user terminal 4. Alternatively, the game server 6 may return connection destination information (IP address and so forth) of the game terminal 5 selected as a distribution game terminal, in response to an information distribution request from the user terminal 4. In this case, the user terminal 4 sends a motion image M distribution request again to the game terminal 5 indicated by the returned connection destination information. The distribution game terminal, in response to an instruction from the game server 6 or a request from the user terminal 4, begins production of a motion image M and distribution of the same to the user terminal 4. This arrangement makes it possible for the user terminal 4 to receive a motion image M directly from the distribution game terminal.

According to the above described embodiment, the game presenting system 1 produces a game presenting screen image which shows motion images M arranged in the form of a list, the motion images M related to the games executed by the respective game systems 2, to thereby present the situations of the games respectively executed by the plurality of game systems 2 in a readily understandable manner.

It should be noted that an embodiment of the present invention is not limited to that described above. For example, although it is described in the above that the user terminal 4 functions as a game presenting machine for producing a game presenting screen image, other information processing devices, such as the list holding server 3, for example, may function as a game presenting machine. Specifically, the game servers 6 keep sending the motion images M produced by the distribution game terminal to the list holding server 3, irrespective of an information distribution request from the user terminal 4, and the list holding server 3 produces a game presenting screen image, such as is shown as an example in FIG. 7, based on the motion images M received from the respective game servers 6, and distributes to the user terminal 4 as a motion image.

It should be noted that although it is described in the above that the user terminal 4 sends executable game information to the list holding server 3 in the process at S11, and that the list holding server 3 returns list information filtered according to the executable game information to the user terminal 4, this is not an exclusive example, and the user terminal 4 may not send executable game information and the list holding server 3 may always return all list information held therein, for example. In this case, the user terminal 4 may extract, from the list information received from the list holding server 3, only the game system 2 executing a game in which the user terminal 4 can participate, based on the game specifying information specifying the game in which the user terminal 4 itself can participate.

Alternatively, the list holding server 3 may hold in advance, for each of the plurality of user terminals 4 sending a list transmission request, a database which contains information which specifies a game which can be executed by the user terminal 4. The information stored in the database is determined based on the information sent in advance from the respective user terminals 4, for example, and the user terminal 4 sends a list transmission request and terminal specification information (a client name, for example) which specifies the user terminal 4 in the process at S11. The list holding server 3 having received the list transmission request obtains information which specifies a game which can be executed in the user terminal 4 specified by the terminal specification information, based on the terminal specification information contained in the list transmission request, while referring to the database. This arrangement makes it possible for the list holding server 3 to send list information about the game system 2 carrying out a game which can be executed by the user terminal 4, without receiving game specifying information from the user terminal 4 many times.

The list holding server 3 may include, as a part of the list information to be sent at S12, information about the game system 2 executing a game other than a game which can be executed by the user terminal 4 (hereinafter referred to as a non-joinable game). When the motion image M sent from the game system 2 executing a non-joinable game is received and included in the game presenting screen image to be produced in the process at S16, the user terminal 4 can present the situation of not only a game in which the new user U1 can participate but also a game in which the new use U1 cannot participate. In this case, PR effect can be expected with the non-joinable game, which encourages the new user U1 to purchase a new game, though the new user U1 cannot participate in the game right now. In this case, the list holding server 3 may select a non-joinable game to be included in the list information to be sent at S12, based on the profile information about the new user U1 using the user terminal 4, for example. With the above, it is possible to present to the new user U1 a motion image M related to a non-joinable game in which the new user U1 is assumed to be interested in participating.

What is claimed is:

1. A game presenting system having game systems including a first game system and a second game system and a game presenting machine operable by a user to play a video game, each of the game systems executing a corresponding video game on at least one game terminal,
the first game system comprising:
a first terminal which is a game terminal for use by a first user participating in the first game;
a second terminal which is a game terminal for use by a second user participating in the first game; and a first distribution terminal selecting device for selecting a first distribution terminal from the first terminal and the second terminal automatically;

the second game system comprising:
a third terminal which is a game terminal for use by a third user participating in the second game;
a fourth terminal which is a game terminal for use by a fourth user participating in the second game; and
a second distribution terminal selecting device for selecting a second distribution terminal from the third terminal and the fourth terminal automatically; and the game presenting machine comprising:
a specifying device that specifies video games already installed in a storage of the game presenting machine or set to be read by a medium information reading unit of the game presenting machine;
a sending device that sends a distribution request of motion images related to the specified video games to the first distribution terminal selecting device and the second distribution terminal selecting device, each of which executes one of the specified video games;
a motion image obtaining device that obtains motion images including a first motion image and a second motion image, the first motion image being generated based on data of a game screen image shown on a first display device of the first distribution terminal and sent from the first distribution terminal selecting device in response to receiving the distribution request, the second motion image being generated based on data of a game screen image shown on a second display device of the second distribution terminal and sent from the second distribution terminal selecting device in response to receiving the distribution request, and, the motion images being motion images of the specified video games;
a third display device that displays a screen having a plurality of display areas, one of which shows the first motion image, and another one of which shows the second motion image; and
a beginning device that begins a game process to play one of the video games which are already installed in the storage of the game presenting machine or set to be read by the medium information reading unit of the game presenting machine and which is associated with a selected one of the motion images which are displayed on the third display device.

2. A game presenting machine operable by a user to play a video game, the game presenting machine connected to game systems including a first game system and a second game system, each of the game systems executing a corresponding video game on at least one game terminal, the first game system comprising:
a first terminal which is a game terminal for use by a first user participating in the first game;
a second terminal which is a game terminal for use by a second user participating in the first game; and
a first distribution terminal selecting device for selecting a first distribution terminal from the first terminal and the second terminal automatically;

the second game system comprising:
a third terminal which is a game terminal for use by a third user participating in the second game;
a fourth terminal which is a game terminal for use by a fourth user participating in the second game; and
a second distribution terminal selecting device for selecting a second distribution terminal from the third terminal and the fourth terminal automatically; and the game presenting machine comprising
a specifying device that specifies video games already installed in a storage of the game presenting machine or set to be read by a medium information reading unit of the game presenting machine;
a sending device that sends a distribution request of motion images related to the specified video games to the first distribution terminal selecting device and the second distribution terminal selecting device, each of which executes one of the specified video games;
a motion image obtaining device that obtains motion images including a first motion image and a second motion image, the first motion image being generated based on data of a game screen image shown on a first display device of the first distribution terminal and sent from the first distribution terminal selecting device in response to receiving the distribution request, the second motion image being generated based on data of a game screen image shown on a second display device of the second distribution terminal and sent from the second distribution terminal selecting device in response to receiving the distribution request, and the motion images being motion images of the specified video games;
a third display device that displays a screen having a plurality of display areas, one of which shows the first motion image, and another one of which shows the second motion image; and
a beginning device that begins a game process to play one of the video games which are already installed in the storage of the game presenting machine or set to be read by the medium information reading unit of the game presenting machine and which is associated with a selected one of the motion images which are displayed on the third display device.

3. A video game presenting method for a game presenting system having game systems including a first game system and a second game system, and a game presenting machine, the first game system comprising:
a first terminal which is a game terminal for use by a first user participating in the first game;
a second terminal which is a game terminal for use by a second user participating in the first game; and
a first distribution terminal selecting device for selecting a first distribution terminal from the first terminal and the second terminal automatically;

the second game system comprising:
a third terminal which is a game terminal for use by a third user participating in the second game;
a fourth terminal which is a game terminal for use by a fourth user participating in the second game; and
a second distribution terminal selecting device for selecting a second distribution terminal from the third terminal and the fourth terminal automatically;

the video game presenting method comprising:
specifying video games already installed in a storage of a game presenting machine or set to be read by a medium information reading unit of the game presenting machine;
sending a distribution request of motion images related to the specified video games to the first distribution terminal selecting device and the second distribution terminal selecting device, each of which executes one of the specified video games on at least one game terminal;

obtaining motion images including a first motion image and a second motion image by the game presenting machine, the first motion image being generated based on data of a game screen image shown on a first display device of the first distribution terminal and sent from the first distribution terminal selecting device in response to receiving the distribution request, the second motion image being generated based on data of a game screen image shown on a second display device of the second distribution terminal and sent from the second distribution terminal selecting device in response to receiving the distribution request, and the motion images being motion images of the specified video games;

displaying on a third display device of the game presenting machine a screen having a plurality of display areas, one of which shows the first motion image, and another one of which shows the second motion image; and beginning a game process to play at the game presenting machine one of the video games which are already installed in the storage of the game presenting machine or set to be read by a medium information reading unit of the game presenting machine and which is associated with a selected one of the motion images which are displayed on the third display device.

4. A non-transitory computer readable information storage medium storing a program which is to be executed by a computer to function as a game presenting machine connected to game systems including a first game system and a second game system, the first game system comprising:
 a first terminal which is a game terminal for use by a first user participating in the first game;
 a second terminal which is a game terminal for use by a second user participating in the first game; and
 a first distribution terminal selecting device for selecting a first distribution terminal from the first terminal and the second terminal automatically;

the second game system comprising:
 a third terminal which is a game terminal for use by a third user participating in the second game;
 a fourth terminal which is a game terminal for use by a fourth user participating in the second game; and
 a second distribution terminal selecting device for selecting a second distribution terminal from the third terminal and the fourth terminal automatically;

the program including instructions to play a video game by:

specifying video games already installed in a storage of the computer or set to be read by a medium information reading unit of the computer;

sending a distribution request of motion images related to the specified video games to the first distribution terminal selecting device and the second distribution terminal selecting device, each of which executes one of the specified video games on at least one game terminal;

obtaining motion images including a first motion image and a second motion image, the first motion image being generated based on data of a game screen image shown on a first display device of the first distribution terminal and sent from the first distribution terminal selecting device in response to receiving the distribution request, the second motion image being generated based on data of a game screen image shown on a second display device of the second distribution terminal and sent from the second distribution terminal selecting device in response to receiving the distribution request, and the motion images being motion images of the specified video games;

displaying on a third display device of the computer a screen having a plurality of display areas, one of which shows the first motion image, and another one of which shows the second motion image; and beginning a game process to play at the computer one of the video games which are already installed in the storage of the computer or set to be read by the medium information reading unit of the computer and which is associated with a selected one of the motion images which are displayed on the third display device.

\* \* \* \* \*